United States Patent [19]
Itoh

[11] Patent Number: 5,970,087
[45] Date of Patent: Oct. 19, 1999

[54] TRANSMISSION DEVICE

[75] Inventor: Shingo Itoh, Komaki, Japan

[73] Assignee: Brother Kogyo Kabushiki Kaisha, Nagoya, Japan

[21] Appl. No.: 08/916,402

[22] Filed: Aug. 22, 1997

[30] Foreign Application Priority Data

Aug. 23, 1996 [JP] Japan .................................. 8-222030

[51] Int. Cl.⁶ ................................................ H04B 1/38
[52] U.S. Cl. ......................... 375/220; 375/295; 375/260; 358/468
[58] Field of Search .................................... 375/220, 222, 375/259, 260, 295; 358/400, 434, 404, 438, 436, 444, 442, 468; 455/557; 395/200.67, 200.68; 379/100.01, 100.05, 100.06, 100.12

[56] References Cited

U.S. PATENT DOCUMENTS

| | | | |
|---|---|---|---|
| 5,159,466 | 10/1992 | Haneda et al. ......................... | 358/434 |
| 5,586,185 | 12/1996 | Shibata et al. ............................ | 380/21 |
| 5,608,546 | 3/1997 | Nakamura ................................ | 358/442 |
| 5,684,864 | 11/1997 | Shibata .................................... | 358/442 |
| 5,748,337 | 5/1998 | Minamizawa ............................ | 358/468 |
| 5,761,399 | 6/1998 | Asano ...................................... | 358/435 |
| 5,790,640 | 8/1998 | Tassa et al. ............................... | 358/407 |

*Primary Examiner*—Chi H. Pham
*Assistant Examiner*—Emmanuel Bayard
*Attorney, Agent, or Firm*—Oliff & Berridge, PLC

[57] ABSTRACT

A transmission device includes: a first transmission unit that transmits data between the transmission device and an information processing device; a second transmission unit that receives data from an external transmission terminal; a determination unit that determines whether the information processing device is executing a data transmission processing program for controlling reception processes of the second transmission unit; and a control unit that, when the second transmission unit is to receive data from the external transmission terminal but not when the determination unit determines that the information processing device is not executing the data transmission processing program controls the first transmission unit to transmit to the information processing device, a predetermined control signal indicating that the second transmission unit is to receive data.

9 Claims, 2 Drawing Sheets

TRANSMISSION DEVICE

BACKGROUND OF THE INVENTION

1. Field of the Invention

The present invention relates to a transmission device such as a facsimile machine and more particularly relates to a transmission device capable of being used in combination with an information processing device such as a personal computer.

2. Description of the Related Art

There has been known a facsimile machine with a function for connecting with a personal computer. With this type of facsimile machine, when the facsimile machine receives a call signal from a remote facsimile machine, the facsimile machine transmits a predetermined control signal, called a ring command, to the personal computer. Because the facsimile machine transmits this control signal to the personal computer when it starts facsimile reception processes, the personal computer is capable of controlling facsimile transmission processes executed between the facsimile machine and the remote facsimile machine. By having the personal computer control execution of facsimile transmission processes, image data received during the facsimile transmission can be inputted as is from the facsimile machine to the personal computer. In this case, the user can process the image data in the personal computer as he or she desires.

However, the personal computer will be unable to control execution of facsimile transmission processes, unless the facsimile transmission processing program is not only pre-stored in a memory of the personal computer, but also is being presently executed by the personal computer. However, the facsimile transmission processing program is seldom continually being executed. For example, the user often executes other programs without executing the facsimile transmission processing program.

On the other hand, whenever this type of conventional facsimile machine receives a facsimile transmission, it will always transmit the ring command signal to the personal computer in order to start up the facsimile transmission processes. Accordingly, even when the facsimile transmission processing program is not being executed in the personal computer, the facsimile machine will transmit the predetermined control signal to the personal computer whenever it receives a call signal from a remote facsimile machine.

When the facsimile machine transmits the predetermined control signal to the personal computer while the personal computer in not executing the facsimile transmission processing program, the personal computer will nevertheless execute some type of response process in response to the control signal. When the personal computer is executing some other program when it receives the control signal, the process it performs in response to the incoming control signal will interrupt and temporarily stop the program presently being executed. On the other hand, even if the personal computer executes this response process, as long as the personal computer is not executing the facsimile transmission processing program, then the personal computer can not execute control of facsimile transmission processes based on the facsimile transmission processing program.

In this way, the conventional facsimile machines transmit the predetermined control signals to the personal computer in order to start facsimile transmission processes in the personal computer. Depending on the operation condition of the personal computer, this control signal may only cause the personal computer to execute an unnecessary interrupt process, thereby temporarily stopping data processes presently being executed by the personal computer. This reduces the processing efficiency of the personal computer.

This problem is not limited to a system wherein a facsimile machine is connected to a personal computer. For example, when another type of transmission device, that is, other than a facsimile machine, is connected to another type of information processing device, that is, other than a personal computer, the same type of problem may occur when data is transmitted between the two devices.

It is conceivable to disconnect the connection between the facsimile machine, or other transmission device, and the personal computer, or other information processing device, whenever the facsimile machine receives a facsimile message. Although this would prevent the ringing command from reaching the personal computer, this method is unacceptable because it would also prevent exchange of necessary commands between the personal computer and the facsimile machine.

It is an objective of the present invention to overcome the above-described problems and to provide a transmission device, such as a facsimile machine, that can be controlled as necessary by an independent information processing device during desired transmission processes, but without unnecessarily interrupting data processes being executed by the information processing device when it is unnecessary for the information processing device to control data transmission processes, thereby enhancing efficiency of the information processing device.

A transmission device including: a first transmission unit that transmits data between the transmission device and an information processing device; a second transmission unit that transmits desired data between the transmission device and an external transmission terminal; a determination unit that determines whether the information processing device is executing a data transmission processing program for controlling transmission processes of the second transmission unit; and a control unit that, unless the determination unit determines that the information processing device is not executing the data transmission processing program, controls the first transmission unit to transmit a predetermined control signal to the information processing device when the second transmission unit is to receive data from the external transmission terminal, the predetermined control signal indicating that the second transmission unit is to receive data.

With this configuration, when the information processing device, such as a computer, is executing the program required for data transmission processes using the second transmission unit of the transmission device, that is, the data transmission processing program, the transmission device will transmit the predetermined control signal to the information processing device so that the information processing device will perform appropriate and desired data transmission processes using the data transmission processing program. On the other hand, when the information processing device is not executing the data transmission processing program, then the transmission device will not transmit the predetermined control signal to the information processing device.

This is in contrast to the conventional situation, wherein the conventional transmission device will attempt to access the information processing device regardless of whether or not the information processing device is capable of executing desired data transmission processes, thereby causing the information processing device to perform unnecessary interrupt routines and unnecessary data processing. In the device according to the present invention, data process efficiency of the Information processing device can be maintained at a high level without the reduction in data processing performance that occurs in the conventional situation.

According to another aspect of the present invention, when the information processing device is not presently executing the data transmission processing program for data transmission processes using the second transmission unit of the transmission device, then whether or not the information processing device is presently executing the data transmission processing program is determined based on signals transmitted from the information processing device to the transmission device when the information processing device starts and stops executing the data transmission processing program. As a result, this determination can be accurately and correctly performed.

According to another aspect of the present invention, when the information processing device is presently executing a facsimile transmission program for performing facsimile transmission using a modem, then the transmission device will transmit the predetermined signal to the information processing device. Then, the information processing device will perform appropriate facsimile transmission processes based on the facsimile transmission program. On the other hand, when the information processing device is not presently executing the facsimile transmission program, then the transmission device will not attempt to unnecessary access the information processing device. As a result, other data processing programs presently executed in the information processing device can be effectively performed without interruption.

According to another aspect of the present invention, a transmission device including: a first transmission unit that transmits data between the transmission device and an information processing device; a second transmission unit that receives data from an external transmission terminal; a determination unit that determines whether the information processing device is executing a data transmission processing program for controlling reception processes of the second transmission unit; and a control unit that, when the second transmission unit is to receive data from the external transmission terminal but not when the determination unit determines that the information processing device is not executing the data transmission processing program controls the first transmission unit to transmit to the information processing device, a predetermined control signal indicating that the second transmission unit is to receive data.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
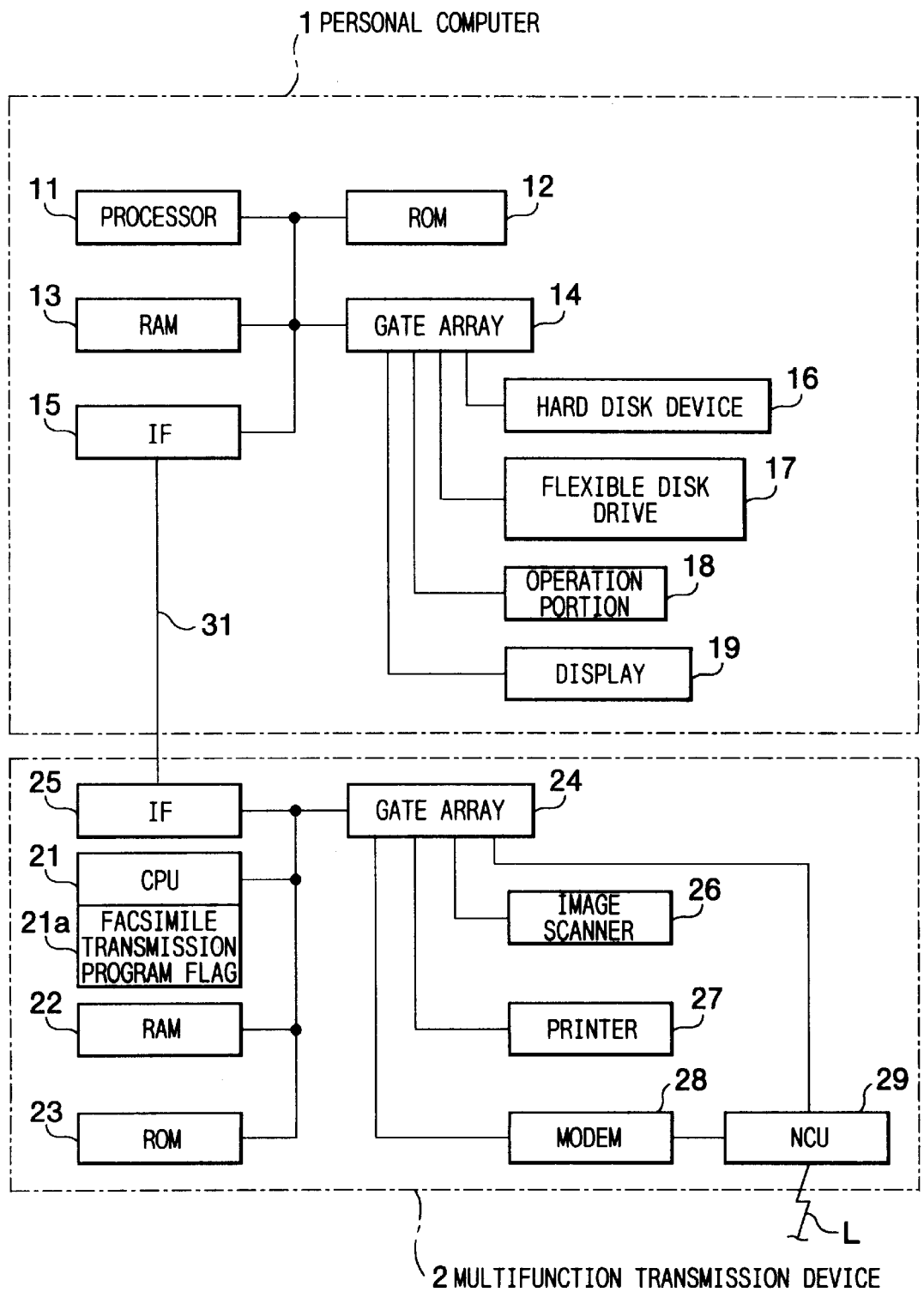
FIG. 1 is a block diagram showing configuration of a multi-function peripheral device according to a first embodiment and an information processing device connected to the multi-function peripheral device.

A transmission device according to a preferred embodiment of the present invention will be described while referring to the accompanying drawings wherein like parts and components are designated by the same reference numerals to avoid duplicating description.

FIG. 1 is a block diagram showing electric connection within and between a multi-function transmission device 2 and a personal computer 1 which are connected together.

The personal computer 1 uses a graphical user interface such as a multi-window type interface and is capable of simultaneously operating a plurality of application software. The multi-function transmission device 2 includes a plurality of functions including a facsimile transmission function, a printer function, an image scanner function, and a copy function. The multi-function transmission device 2 includes a CPU 21, a RAM 22, ROM 23, a gate array 24, an interface 25, an image scanner 26, a printer 27, a modem 28, and an NCU 29. The CPU 21, the RAM 22, the ROM 23, the gate array 24, and the interface 25 are mutually connected together by a bus line. The bus line includes a data bus, an address bus, and a control signal line.

The CPU 21 controls overall processes of the multi-function transmission device 2. The RAM 22 and the ROM 23 store data and programs for controlling each component of the multi-function transmission device 2. The ROM 23 stores programs for executing facsimile transmission processes. The multi-function transmission device 2 is configured so as to be capable of independently executing facsimile transmission processes by using the modem 28. However, as will be described later, the multi-function transmission device 2 is capable of executing the facsimile transmission by using the modem 28 but under the control of the personal computer 1.

The interface 25 is connected to an interface 15 of the personal computer 1 via a cable 31. The interface 25 controls transmission and reception of a variety of data between the multi-function transmission device 2 and the personal computer 1 based on a standard, such as RS-232C. The gate array 24 serves as an interface between the CPU 21 and the image scanner 26, the printer 27, the modem 28, and the NCU 29. The image scanner 26 has a function for retrieving an image from a document and converting the image into an image signal The printer 27 has a function for printing out image data onto a desired recording sheet.

The modem 28 is capable of executing facsimile transmission. During facsimile transmission, the modem 28 performs modulation processes on data to be transmitted and performs demodulating processes on data received from a remote facsimile machine. The modem 28 is connected to the NCU 29. The NCU 29 is connected to a transmission line L, such as a telephone line, and is for performing network control. The NCU 29 connects and interrupts the transmission line L according to the commands from the CPU 21. The NCU 29 also transmits a predetermined signal to the CPU 21 to indicate that a predetermined call signal has been transmitted from an external device over the transmission line L.

Next, an explanation will be provided for configuration of the personal computer 1. The personal computer 1 includes the interface 15 described above, a processor 11, a ROM 12, a RAM 13, a gate array 14, a hard disk device 16, a floppy disk drive 17, an operation portion 18, and a display 19. A bus line, that is, including a data bus, an address bus, and a control signal line, connects the processor 11, the ROM 12, the RAM 13, the gate array 14, and the interface 15.

The processor 11 performs information processes based on programs such as a variety of application software and operation systems installed in the hard disk device 16. The ROM 12 and the RAM 13 store a variety of data and programs. The gate array 14 serves as an interface between the processor 11 and the hard disk device 16, the floppy disk drive 17, the operation portion 18, and the display 19. The floppy disk drive 17 is capable of retrieving information from a floppy disk. The operation portion 18 includes a plurality of operation switches such as a ten key pad. The display 19 is configured by a cathode ray tube (CRT) or a liquid crystal display (LCD).

The hard disk device 16 of the personal computer 1 is installed with a variety of application software, such as a facsimile transmission program that enables the personal computer 1 to control facsimile transmission processes using the modem 28 of the multi-function transmission device 2 so that image data obtained during a facsimile transmission is inputted and stored in the personal computer 1. It should be noted that another facsimile transmission program is stored in the ROM 23 of the multi-function transmission device 2. However, the facsimile transmission program stored in the hard disk device 16 is different from other program stored in the ROM 23. The hard disk device 16 is installed with other programs as well, including application software for realizing a variety of functions such as using the printer 27 of the multi-function transmission device 2 to print out text or images produced in the personal computer 1 and using the image scanner 26 to retrieve images from a document and input image signals into the personal computer 1 accordingly. The application software is installed in the hard disk device 16 by inserting a floppy disk Into the floppy disk drive 17 and performing predetermined operations on the operation portion 18.

The processor 11 is configured so that when the processor 11 receives a predetermined control signal from the multi-function transmission device 2 while the personal computer 1 is executing the facsimile transmission program transmission, the processor 11 controls the interface 15 to transmit a variety of signals so that the modem 28 of the multi-function transmission device 2 executes facsimile transmission processes based on the facsimile transmission program installed in the hard disk device 16. The processor 11 is configured to transmit a predetermined start-up command, which Indicates that the facsimile transmission program is presently being executed, to the multi-function transmission device 2 over the interface 15. Further, the processor 11 is configured to transmit a predetermined termination command, which indicates that the processor 11 has stopped execution of the facsimile transmission program, to the multi-function transmission device 2 over the interface 15. It should be noted that when the facsimile transmission program is being executed as relates to the present invention, the facsimile transmission program is not merely installed in the hard disk device 16, but is being executed by the processor 11 so that the processor 11 can immediately execute, at a predetermined timing, a series of data processes based on the facsimile transmission program.

The CPU 21 of the multi-function transmission device 2 determines whether or not the facsimile transmission program is presently being executed in the personal computer 1 based on whether or not the personal computer 1 has transmitted a start-up command or a termination command to the interface 25. That is to say, when the personal computer 1 transmits a start-up command to the interface 25 but has not transmitted a termination command, the CPU 21 determines that the facsimile transmission program is presently being executed in the personal computer 1. In contrast with this, when the personal computer 1 has not transmitted a start-up command to the interface 25, or when a start-up command has been transmitted followed by transmission of a termination command, the CPU 21 determines that the facsimile transmission program is not being executed in the personal computer 1. As will be described later, this determination is executed by monitoring 0 or 1 setting of a predetermined facsimile transmission program flag 21a in the CPU 21.

The CPU 21 is configured so that when the multi-function transmission device 2 receives a call signal from an external transmission terminal (not shown in the drawings) connected to the transmission line L so that the NCU 29 receives a predetermined call signal, then the CPU 21 executes processes for transmitting a predetermined control signal, which indicates that the call signal has been received by the NCU 29, from the interface 25 to the personal computer 1. However, it should be noted that the CPU 21 only executes processes for transmitting the predetermined control signal to the personal computer 1 when it determines that the personal computer 1 is presently executing the facsimile transmission program. When the CPU 21 determines that the personal computer 1 is not presently executing the facsimile transmission program, the CPU 21 will not transmit the predetermined control signal to the personal computer 1, but will instead execute facsimile transmission processes independently in the multi-function transmission device 2.

Figure 2:
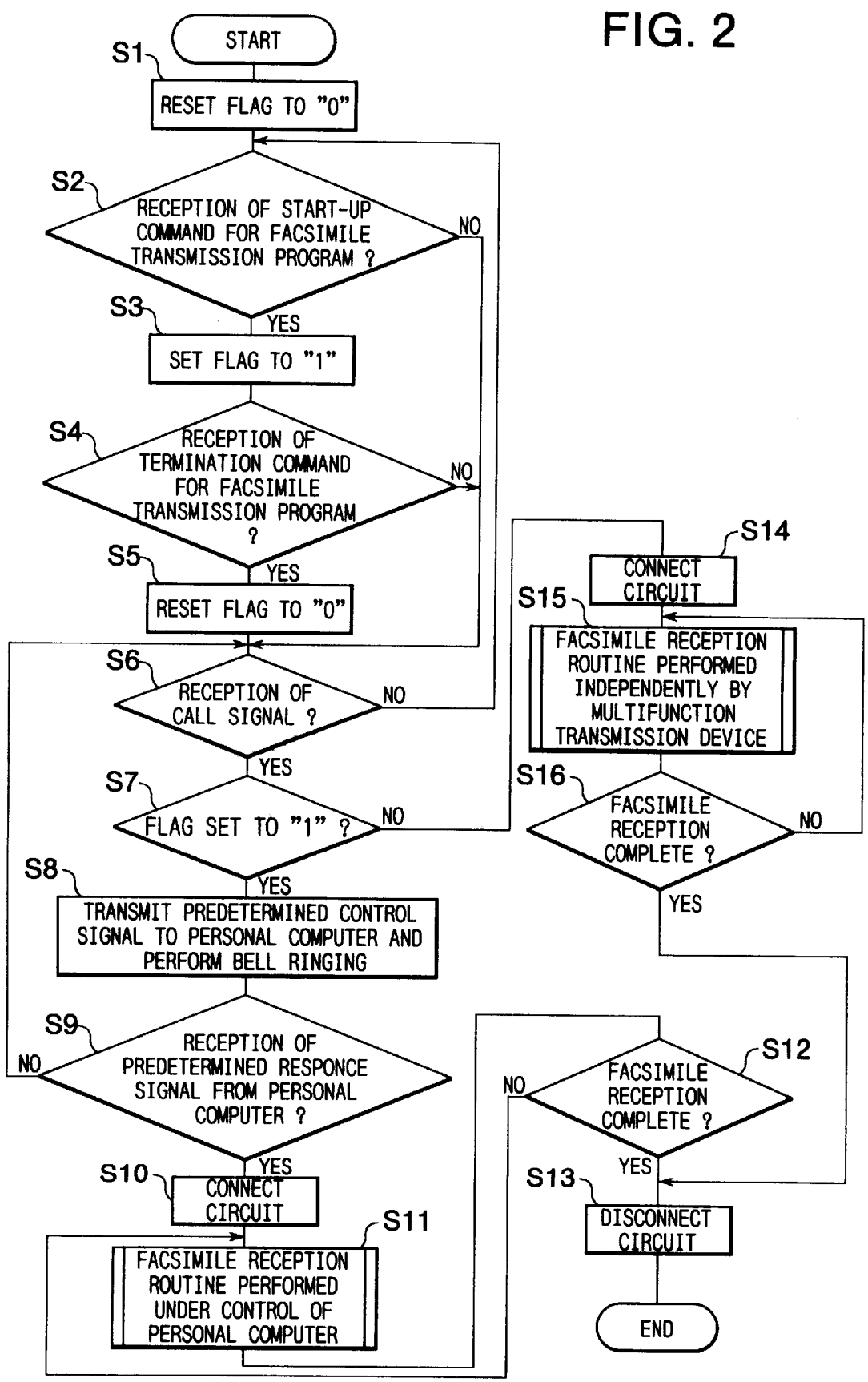
FIG. 2 is a flowchart representing operations performed in the multi-function peripheral device during reception of an incoming facsimile transmission.

Next, while referring to the flowchart shown in FIG. 2. an explanation will be provided for processes performed by the multi-function transmission device 2 when the personal computer 1 and the multi-function transmission device 2 are used to perform facsimile transmission processes.

When the multi-function transmission device 2 is first started up, then in S1, the CPU 21 sets the predetermined facsimile transmission program flag 21a to 0 as an initial setting. As mentioned previously, this predetermined facsimile transmission program flag 21a is used for determining whether or not the personal computer 1 is presently executing the facsimile transmission program. When the predetermined facsimile transmission program flag 21a is set to 0, this indicates that the personal computer 1 is not presently executing the facsimile transmission program. On the other hand, when the predetermined facsimile transmission program flag 21a is set to 1, this indicates that the personal computer 1 is presently executing the facsimile transmission program. Next in S2, whether or not the multi-function transmission device 2 has received a start-up command from the personal computer 1 is determined. When the personal computer 1 is presently executing the facsimile transmission program and the multi-function transmission device 2 receives a start-up command accordingly from the personal computer 1 (S2;YES), then in S3, the CPU 21 sets the predetermined facsimile transmission program flag 21a to 1. In S4, whether or not the multi-function transmission device 2 has received a termination command from the personal computer 1 is determined. If so (S4:YES), then in S5, the CPU 21 sets the facsimile transmission program flag 21a to 0. In this way, the facsimile transmission program flag 21a will remain in its 0 condition when the multi-function transmission device 2 does not receive a start-up command from the personal computer 1. On the other hand, the facsimile transmission program flag 21a will be switched back to 0 when the multi-function transmission device 2 receives a termination command from the personal computer 1 after receiving a start-up command.

Next in S6, whether or not the multi-function transmission device 2 has received a call signal from the external transmission terminal is determined. When a predetermined call signal is transmitted over the transmission line L (S6:YES), then in S7, the CPU 21 determines the setting of the facsimile transmission program flag 21a at that time. When the personal computer 1 is presently executing the facsimile transmission program so that the facsimile transmission program flag 21a is set to 1 (S7:YES), then in S8, the CPU 21 will transmit the predetermined control signal to the personal computer 1. At this time, the CPU 21 can also simultaneously ring a bell to indicate to the user that a facsimile message has been received. Next in S9, whether or not the multi-function transmission device 2 has received a response signal from the personal computer 1 in response to the predetermined control signal is determined. If so (S9:YES), then the telephone circuit is connected in S10, and in S11, the processor 11 of the personal computer 1 executes facsimile transmission processes based on the facsimile transmission program installed in the hard disk device 16.

In other words, when the facsimile transmission program flag 21a is determined to be set to 1 (S7:YES), then the processor 11 performs the facsimile transmission processes by transmitting predetermined control commands to the multi-function transmission device 2 and controls the multi-function transmission device 2. Explained in more detail, first the processor 11 transmits a control command to execute telephone circuit connection processes in the multi-function transmission device 2. In response to this, the NCU 29 of the multi-function transmission device 2 connects the transmission line L in S10. After telephone circuit connection is completed, the personal computer 1 controls the modem 28 to execute facsimile transmission in S11. Next, in S12, whether or not facsimile transmission has been completed is determined. If so (S12:YES), then in S13, the personal computer 1 controls, in this way, the multi-function transmission device 2 to disconnect the transmission line L. When the personal computer 1 controls facsimile transmission processes performed by the multi-function transmission device 2, image data received by the modem 28 can be sequentially inputted from the multi-function transmission device 2 to the personal computer 1, whereupon the image data can be stored in the RAM 13 of the hard disk device 16 of the personal computer 1.

On the other hand, when the personal computer 1 is not executing the facsimile transmission program (S2:NO, S4:YES), then the facsimile transmission program flag 21a will be set to 0 (S7:NO). As a result, the CPU 21 will not transmit the predetermined control signal to the personal computer 1 and will not attempt to access the personal computer 1. Instead, the CPU 21 will Independently perform facsimile transmission processes in the multi-function transmission device 2. Explained in more detail, in S14, the CPU 21 will control the NCU 29 to connect the transmission line L. Next in S15, the CPU 21 will control the modem 28 to perform facsimile reception processes based on the other facsimile transmission program stored in the ROM 23. At this time, the CPU 21 can also simultaneously ring a bell to indicate to the user that a facsimile message has been received. Once the CPU 21 has determined that the facsimile transmission processes have been completed (S16:YES), then it will disconnect the transmission line L in S13. Image data received during the facsimile transmission in this way is stored in the RAM 22 of the multi-function transmission device 2. Alternatively, the image data can be serially transmitted to the printer 27 and printed out onto a recording sheet.

In this way, the multi-function transmission device 2 does not attempt to unnecessarily access the personal computer 1 when the personal computer 1 is not executing the facsimile transmission program. Instead, the multi-function transmission device 2 will independently execute facsimile transmission processes. Accordingly, when the personal computer 1 is executing a different application software program, there will be no need for the personal computer 1 to unnecessarily interrupt the presently executed processes 50 that efficiency of the data processes executed by the personal computer 1 is increased. On the other hand, when the personal computer 1 is executing the facsimile transmission program, desired facsimile transmission processes can be performed based on the facsimile transmission program, which is convenient for the user.

While the invention has been described in detail with reference to specific embodiments thereof, it would be apparent to those skilled in the art that various changes and modifications may be made therein without departing from the spirit of the invention, the scope of which is defined by the attached claims.

For example, the present invention can be applied for transmission processes other than facsimile transmission, such as data transmission processes for data other than image data.

Although the embodiment describes the present invention applied to the multi-function transmission device including a variety of functions such as a scanner function and a printer function, the present invention can be applied to a transmission device with a variety of changes performed to the above-described components. The present invention is also not limited to use with the personal computer, or to the combination of information processing device and the transmission device, described in the embodiment.

What is claimed is:

1. A transmission device comprising:
   a first transmission unit that transmits data between the transmission device and an information processing device;
   a second transmission unit that transmits desired data between the transmission device and an external transmission terminal;
   a determination unit that determines, based on signals from the information processing device, whether the information processing device is executing a data transmission processing program for controlling transmission processes of the second transmission unit; and
   a control unit that, unless the determination unit determines that the information processing device is not executing the data transmission processing program, controls the first transmission unit to transmit a predetermined control signal to the information processing device when the second transmission unit is to receive data from the external transmission terminal, the predetermined control signal indicating that the second transmission unit is to receive data, such that the information processing device is prevented from unnecessary interruptions of data processes being executed when the determination unit determines that the information processing device is not executing the data transmission processing program.

2. A transmission device as claimed in claim 1, wherein the determination unit determines that the information processing device is executing the data transmission processing program based on signals transmitted from the information processing device to the first transmission unit when the information processing device starts up and stops the data transmission processing program.

3. A transmission device as claimed in claim 2, wherein the second transmission unit is a modem that transmits facsimile data between the transmission device and the external transmission terminal and wherein the control unit does not transmit the predetermined control signal to the information processing device when the determination unit determines that the information processing device is not executing a facsimile transmission processing program for controlling facsimile transmission processes using the modem.

4. A transmission device as claimed in claim 1, wherein the second transmission unit is a modem that transmits facsimile data between the transmission device and the external transmission terminal and wherein the control unit does not transmit the predetermined control signal to the information processing device when the determination unit determines that the information processing device is not executing a facsimile transmission processing program for controlling facsimile transmission processes using the modem.

5. A transmission device as claimed in claim 1, wherein the control unit controls the second transmission unit to perform transmission processes independently of the information processing device when the determination unit determines that the information processing device is not executing the data transmission processing program.

6. A transmission device as claimed in claim 5, further comprising a recording unit that records data on a recording medium, the control unit controlling the second transmission unit to send data to the recording unit and controlling the recording unit to record the data from the second transmission unit when the determination unit determines that the information processing device is not executing the data transmission processing program.

7. A transmission device as claimed in claim 5, further comprising a memory for storing data, the control unit controlling the second transmission unit to send data to the memory and controlling the memory to store the data from the second transmission unit when the determination unit determines that the information processing device is not executing the data transmission processing program.

8. A transmission device as claimed in claim 1, wherein the control unit controls the second transmission unit to perform transmission processes based on the data transmission processing program of the information processing device when the determination unit determines that the information processing device is executing the data transmission processing program.

9. A transmission device comprising:
   a first transmission unit that transmits data between the transmission device and an information processing device;
   a second transmission unit that receives data from an external transmission terminal;
   a determination unit that determines, based on signals from the information processing device, whether the information processing device is executing a data transmission processing program for controlling reception processes of the second transmission unit; and
   a control unit that, when the second transmission unit is to receive data from the external transmission terminal but not when the determination unit determines that the information processing device is not executing the data transmission processing program controls the first transmission unit to transmit to the information processing device, a predetermined control signal indicating that the second transmission unit is to receive data, such that the information processing device is prevented from unnecessary interruptions of data processes being executed when the determination unit determines that the information processing device is not executing the data transmission processing program.

* * * * *